(12) United States Patent
Anker et al.

(10) Patent No.: US 9,522,988 B2
(45) Date of Patent: Dec. 20, 2016

(54) POLYOLEFIN PIPE WITH IMPROVED MIGRATION BEHAVIOUR

(75) Inventors: Martin Anker, Hisings Karra (SE); Svein Jamtvedt, Stathelle (NO)

(73) Assignee: BOREALIS AG, Vienna (AT)

( * ) Notice: Subject to any disclaimer, the term of this patent is extended or adjusted under 35 U.S.C. 154(b) by 560 days.

(21) Appl. No.: 14/111,938

(22) PCT Filed: Jan. 5, 2012

(86) PCT No.: PCT/EP2012/000041
§ 371 (c)(1),
(2), (4) Date: Oct. 25, 2013

(87) PCT Pub. No.: WO2012/139673
PCT Pub. Date: Oct. 18, 2012

(65) Prior Publication Data
US 2014/0037879 A1 Feb. 6, 2014
US 2014/0302266 A9 Oct. 9, 2014

(30) Foreign Application Priority Data

Apr. 15, 2011 (EP) .................................. 11003199

(51) Int. Cl.
*F16L 9/12* (2006.01)
*C08K 5/33* (2006.01)
*F16L 9/133* (2006.01)
*C08K 5/32* (2006.01)
*C08K 5/3435* (2006.01)
*C08K 5/3462* (2006.01)
*F16L 9/127* (2006.01)

(52) U.S. Cl.
CPC . *C08K 5/33* (2013.01); *C08K 5/32* (2013.01); *C08K 5/3435* (2013.01); *C08K 5/3462* (2013.01); *F16L 9/12* (2013.01); *F16L 9/127* (2013.01); *F16L 9/133* (2013.01); *Y10T 428/139* (2015.01); *Y10T 428/1393* (2015.01)

(58) Field of Classification Search
CPC ........... C08K 5/32; C08K 5/33; C08K 5/3435; C08K 5/3462; C08L 23/02; C08L 23/10; F16L 9/12; F16L 9/127; F16L 9/133; F16L 11/04; F16L 11/14; Y10T 428/139; Y10T 428/1393
See application file for complete search history.

(56) References Cited

U.S. PATENT DOCUMENTS

| | | | |
|---|---|---|---|
| 5,908,679 A | 6/1999 | Berthold et al. | |
| 6,444,733 B1 | 9/2002 | Stadler | |
| 8,546,504 B2 * | 10/2013 | Lee | C08L 23/10 524/528 |
| 2005/0209379 A1 | 9/2005 | Botkin et al. | |
| 2005/0250889 A1 | 11/2005 | Malik et al. | |
| 2007/0123620 A1 * | 5/2007 | Nayak | C08K 5/32 524/251 |
| 2007/0254990 A1 | 11/2007 | Lewoniuk et al. | |
| 2008/0221242 A1 | 9/2008 | Gelbin | |

FOREIGN PATENT DOCUMENTS

| | | |
|---|---|---|
| CN | 1444624 A | 9/2003 |
| EP | 0739937 A2 | 10/1996 |
| EP | 0810235 A2 | 12/1997 |
| EP | 1911798 A1 | 4/2008 |
| EP | 2014704 A1 | 1/2009 |
| GB | 2305180 A | 4/1997 |
| WO | 01/62840 A1 | 8/2001 |
| WO | 02/102891 A1 | 12/2002 |
| WO | 2004055068 A1 | 7/2004 |
| WO | 2004055069 A1 | 7/2004 |

OTHER PUBLICATIONS

International Search Report of PCT/EP212/000041 dated Feb. 8, 2012.

* cited by examiner

*Primary Examiner* — Walter B Aughenbaugh
(74) *Attorney, Agent, or Firm* — Roberts Mlotkowski Safran Cole & Calderon, P.C.

(57) ABSTRACT

A polyolefin pipe having a polyolefin base resin (A) including a lower molecular weight fraction and a higher molecular weight fraction, stabilized with at least one stabilizer (B) having a formula:

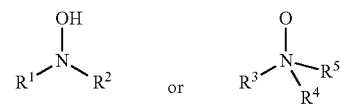

and at least one stabilizer (C) having a formula:

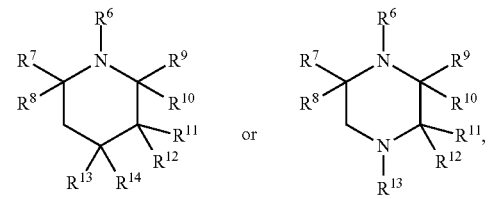

wherein the substituents are as described in the specification. The composition demonstrates acceptable stability and low migration of additional additives from the pipe.

15 Claims, No Drawings

POLYOLEFIN PIPE WITH IMPROVED MIGRATION BEHAVIOUR

The present invention relates to a pipe made of a polyolefin composition providing acceptable process-stability and long-term stability and at the same time showing low migration of the used additives and its decomposition products, especially phenolics. The present invention is also directed to the use of a polyolefin composition for the production of a pipe which has the advantageous properties mentioned above. The present invention further relates to the use of a combination of particular types of stabilizers in a polyolefin composition for providing acceptable process-stability and long-term stability to a pipe made of said polyolefin composition and at the same time maintaining low migration of the used additives and its decomposition products, especially phenolics, out of said polyolefin composition or pipe, respectively.

Recent progress in the manufacturing and processing of polymers has led to the application of plastics in virtually every aspect of modern day life. However, polymeric compounds are prone to aging under the effects of oxidants, light and heat. This results in a loss of lifetime such as loss of strength, stiffness and flexibility, discoloration and scratching as well as loss of gloss.

It is well-known in the art that antioxidants and light stabilizers can prevent or at least reduce these effects. Several types of additives are added to polymers to protect them during processing and to achieve the desired end-use properties. Additives are generally divided in stabilizers and modifiers. Stabilizers, like antioxidants, traditionally and currently used comprise sterically hindered phenolics, aromatic amines, hindered amine stabilizers, organo-phosphites/phosphonites and thioethers. However, appropriate combinations of stabilizers have to be carefully selected, depending on the desired final properties, the polymeric article should have and depending on the field of application.

Besides many other applications, polyolefins are used for the preparation of pipes for drinking water distribution systems. Due to the permanent contact to the inner pipe surface, compounds can migrate from the pipe material into the water. The admissible amounts of compounds within the drinking water are fixed by legal requirements and even stricter requirements are to be expected in the future.

Migration behavior of stabilizers and modifiers added to polyolefin-based materials is dependent from a number of different properties such as diffusion rate of the molecules within the polymer matrix, chemical stability of the additives, etc. Similar considerations apply for decomposition products of said stabilizers and modifiers. Furthermore, it has to be taken into account that an improvement in migration behavior must not be obtained on the expense of stabilization of the polymer matrix. Thus, providing an additive composition of low migration tendency is not straight-forward but rather needs a careful selection of appropriate compounds.

GB 2 305 180 discloses polyolefin compositions which are in permanent contact with extracting media, e.g. water, these compositions further comprising organic phosphites/phosphonites and phenolic compounds or sterically hindered amines as stabilizing components.

EP 1 911 798 discloses low migration polyolefin compositions for water pipes comprising a sterically hindered phenolic compound and an organo-phosphite/phosphonite compound.

EP 2 014 704 discloses low migration polyolefin compositions for water pipes comprising a sterically hindered phenolic compound and a vitamin E-type compound. Particularly the migration of phenolic decomposition and/or by-products is reduced.

Generally speaking, phenolic antioxidants play an important role for such pipe applications. They mainly confer long-term stability and also process-stability. They are usually added in combination with phosphite stabilizers which mainly confer process-stability. Most of them also comprise phenolic residues, e.g. the 2,4-di-tert. butyl group. Upon hydrolysis phenolic spezies may be created which can migrate into the drinking water.

However, considering stricter legal requirements to be expected in the near future, it is highly appreciated to provide pipes of high thermal and chemical stability which release only a very much smaller amount of additives and/or decomposition products into the water. Particularly, migration of phenolic compounds, e.g. compounds comprising at least one phenyl residue, into drinking water is a problem.

Thus, it is an object of the present invention to provide a polyolefin composition for pipes showing low migration of the used additives and its decomposition products, especially phenolic decomposition and/or by-products, out of the composition, without losing the stabilisation effect of the stabilisers, in particular as regards stabilisation during processing and for obtaining the desired long-term properties.

The present invention is based on the finding that the object of the invention can be achieved, if the polyolefin composition comprises a specific combination of two types of stabilizers.

Therefore, the present invention relates to a pipe comprising a polyolefin composition comprising a) a polyolefin base resin (A), b) a stabilizer (B) according to formula (I)

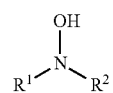

or formula (II)

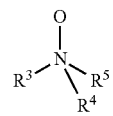

wherein $R^1$, $R^2$, $R^3$, $R^4$ and $R^5$ are independently from each other non-substituted or substituted aliphatic or aromatic hydrocarbyl radicals with not more than 50 carbon atoms each, which may comprise heteroatoms;

c) a stabilizer (C) according to formula (III)

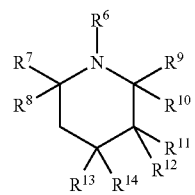

or formula (IV)

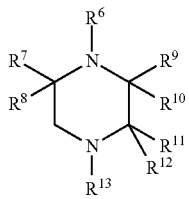

wherein
$R^6$ is hydrogen or a non-substituted or substituted aliphatic or aromatic hydrocarbyl radical, which may comprise heteroatoms, $R^7$, $R^8$, $R^9$ and $R^{10}$ are independently from each other non-substituted or substituted aliphatic or aromatic hydrocarbyl radicals, which may comprise heteroatoms, $R^{11}$ and $R^{12}$ are independently from each other hydrogen or non-substituted or substituted aliphatic or aromatic hydrocarbyl radicals, which may comprise heteroatoms, or are together a substituent =O, and $R^{13}$ and/or $R^{14}$ are independently from each other hydrogen or non-substituted or substituted aliphatic or aromatic hydrocarbyl radicals, which may comprise heteroatoms.

Preferably, the pipe according to the invention consists of said polyolefin composition, more preferably is made from said polyolefin composition e.g. by extrusion.

It has been found that pipes according to the invention both show process-stability and high long-term stability as measured by pressure testing also without addition of usual amounts of phenolic antioxidants or phosphites. This helps to provide low migration of the used additives and its decomposition products, especially phenolic decomposition and/or by-products, out of the composition.

$R^1$, $R^2$, $R^3$ and $R^4$ preferably comprise at least six carbon atoms each. More preferably, $R^1$ and $R^2$ comprise at least ten carbon atoms each, even more preferably at least twelve carbon atoms each.

$R^1$, $R^2$, $R^3$ and $R^4$ preferably comprise not more than 40 carbon atoms each, more preferably not more than 35 carbon atoms each, still more preferably not more than 30 carbon atoms each and most preferably not more than 25 carbon atoms each.

The heteroatoms which may be present in the non-substituted or substituted aliphatic or aromatic hydrocarbyl radicals $R^1$, $R^2$, $R^3$, $R^4$ and/or $R^5$ of stabilizer (B) according to formula (I) or (II) may be oxygen, sulphur, nitrogen and/or phosphorus. It is, however, preferred that $R^1$, $R^2$, $R^3$, $R^4$ or $R^5$, more preferred $R^1$, $R^2$, $R^3$, $R^4$ and $R^5$, do not comprise heteroatoms, i.e. are non-substituted or substituted aliphatic or aromatic hydrocarbyl radicals.

Preferably $R^1$, $R^2$, $R^3$, $R^4$ and $R^5$ comprise non-substituted aliphatic hydrocarbyl radicals, more preferably alkyl chains.

$R^1$ and $R^2$ is preferably the same organic residue.

$R^3$ and $R^4$ preferably comprise non-substituted aliphatic hydrocarbyl radicals, more preferably alkyl chains, with 12 to 25 carbon atoms.

$R^3$ and $R^4$ is preferably the same organic residue.

$R^5$ preferably comprises not more than five carbon atoms, more preferably not more than three carbon atoms. It is particularly preferred that $R^5$ is a methyl group.

Suitable compounds for formula (I) are e.g. N,N-dibenzylhydroxylamine (CAS-no. 143925-92-2, Irgastab FS 042 available from Ciba Specialty Chemicals) and N,N-bis(octadecyl)hydroxylamine (CAS-no. 621-07-8, BNX-2000 available from Mayzo).

A suitable class of compounds for formula (II) is e.g. a di(rape-oil) alkyl N-methyl amine oxide (CAS-no. 204933-93-7, Genox EP available from Chemtura).

$R^6$ preferably comprises an aliphatic hydrocarbyl radical, more preferably an alkyl chain, comprising heteroatoms, more preferably the amount of carbon atoms is between 1 and 10, even more preferably between 1 and 5. It is also preferred that there is an oxygen atom which is directly attached to the nitrogen atom.

In a particular preferred embodiment $R^6$ comprises an aliphatic hydrocarbyl radical, more preferably an alkyl chain, with 1 to 5 carbon atoms, without any heteroatom, more preferably $R^6$ is a methyl group.

In an alternative particular preferred embodiment $R^6$ is hydrogen.

$R^7$, $R^8$, $R^9$ and $R^{10}$ are independently from each other preferably non-substituted or substituted aliphatic hydrocarbyl radicals, which may comprise heteroatoms, more preferably do not comprise any heteroatom.

It is further preferred that $R^7$, $R^8$, $R^9$ and $R^{10}$ are independently from each other non-substituted aliphatic hydrocarbyl radicals, more preferably alkyl chains, which do not comprise any heteroatom, more preferably comprise 1 to 10 carbon atoms, still more preferably comprise 1 to 5 carbon atoms, and most preferred are a methyl group.

In a preferred embodiment the preferred requirements for $R^7$, $R^8$, $R^9$ and $R^{10}$ mentioned above are fulfilled for all of $R^7$, $R^8$, $R^9$ and $R^{10}$ at the same time, more preferably $R^7$, $R^8$, $R^9$ and $R^{10}$ are the same.

In a particular preferred embodiment $R^7$, $R^8$, $R^9$ and $R^{10}$ are a methyl group.

$R^{11}$ and $R^{12}$ are independently from each other preferably non-substituted or substituted aliphatic hydrocarbyl radicals, which may comprise heteroatoms, more preferably do not comprise any heteroatom.

It is further preferred that $R^{11}$ and $R^{12}$ are independently from each other non-substituted aliphatic hydrocarbyl radicals, more preferably alkyl chains, which do not comprise any heteroatom, more preferably comprise 1 to 10 carbon atoms, still more preferably comprise 1 to 5 carbon atoms.

In a preferred embodiment $R^{11}$ and $R^{12}$ are independently from each other non-substituted aliphatic hydrocarbyl radicals, more preferably alkyl chains, which do not comprise any heteroatom with 1 to 5 carbon atoms, or hydrogen.

It is particularly preferred that $R^{11}$ and $R^{12}$ are independently selected from hydrogen and a methyl group, more preferably both $R^{11}$ and $R^{12}$ are a hydrogen atom.

In case of a stabilizer (C) according to formula (IV) it is particularly preferred that $R^{11}$ and $R^{12}$ are together a substituent =O.

$R^{13}$ preferably comprises a backbone of a polymeric structure, wherein the atom of the polymeric structure which is directly attached to the carbon atom of formula (III) or (IV) is a nitrogen atom.

More preferably, stabilizer (C) according to formula (III) or (IV) comprises a polymeric backbone with attached groups of either of formula (III) or (IV), wherein the attachment is via a nitrogen atom of the backbone to the carbon atom bonded to $R^{13}$. More preferably, the stabilizer (C) comprises only attached groups according to formula (III). Still more preferably, two attached groups according to formula (III) are grouped together insofar that the backbone between the two nitrogen atoms used for attachment comprises —$(CH_2)_6$—, thereby defining a backbone unit b1.

Even more preferably, two of said backbone units b1 are connected to each other by a backbone unit b2 which comprises a 1,3,5-triazine group and b2 is attached to said nitrogen atom of b1 by carbon atoms 2 and 6 of the 1,3,5-triazine group. More preferably, the 1,3,5-triazine group comprises substituents at carbon atom 4, which may comprise heteroatoms. More preferably, the substituent at carbon atom 4 of said 1,3,5-triazine group is attached to carbon atom 4 of said 1,3,5-triazine group by a nitrogen atom.

Still more preferably said nitrogen atom comprises two further attached groups selected from hydrogen, C1-C10, preferably C1-C5 alkyl, and a 4-piperidinyl group, or said nitrogen atom is part of a 6-morpholino group.

It is particularly preferred that $R^6$ is a hydrogen atom or a methyl group.

It is particularly preferred that all of $R^7$, $R^8$, $R^9$ and $R^{10}$ are methyl groups.

It is particularly preferred that $R^{11}$ and $R^{12}$ are hydrogen atoms.

In case of a stabilizer (C) according to formula (III) it is preferred that $R^{14}$ is hydrogen.

Suitable compounds for formula (III) are e.g. Chimassorb 2020 (CAS-no. 192268-64-7 available from Ciba Specialty Chemicals), Chimassorb 944 (CAS-no. 71878-19-8 available from Ciba Specialty Chemicals), Tinuvin NOR 371 (available from Ciba Specialty Chemicals), Cyasorb UV-3346 (CAS-no. 82451-48-7 available from Cytec) and Cyasorb UV-3529 (CAS-no. 193098-40-7 available from Cytec).

The concentration of stabilizer (B) in the polyolefin composition is preferably at least 50 ppm, more preferably at least 100 ppm, still more preferably at least 500 ppm based on the total composition.

The concentration of stabilizer (B) in the polyolefin composition is preferably 5000 ppm or less, more preferably 3000 ppm or less, still more preferably 2000 ppm or less, based on the total composition.

The concentration of stabilizer (C) in the polyolefin composition is preferably at least 50 ppm, more preferably at least 100 ppm, still more preferably at least 500 ppm, based on the total composition.

The concentration of stabilizer (C) in the polyolefin composition is preferably 5000 ppm or less, more preferably 3000 ppm or less, based on the total composition.

The term "base resin" denotes the entirety of polymeric components in the polyolefin composition according to the invention, usually making up at least 90 wt % of the total composition.

The favourable effect of the stabilizers according to the present invention is not dependent on the type of polyolefin base resin used. The base resin may therefore be any polyolefin or polyolefin composition.

However, it is preferred that the base resin (A) comprises an ethylene homo- or copolymer or a propylene homo- or copolymer. Preferably, the comonomer is selected from ethylene and alpha-olefins with 4 to 8 carbon atoms. Still more preferably ethylene or an alpha-olefin selected from 1-butene, 1-hexene, 4-methyl-1-pentene and 1-octene is used.

The amount of comonomer in the base resin (A) is preferably between 0.1 mol % and 7.0 mol %.

It is particularly preferred that the base resin (A) comprises an ethylene homo- or copolymer, more preferably that the base resin (A) consists of an ethylene homo- or copolymer.

In one embodiment of the invention the base resin comprises two or more polyolefin, more preferably polyethylene, fractions with different weight average molecular weight. Such resins usually are denoted as multimodal resins.

Polyolefin, in particular polyethylene, compositions comprising multimodal resins are frequently used e.g. for the production of pipes due to their favourable physical and chemical properties as e.g. mechanical strength, corrosion resistance and long-term stability. Such compositions are described e.g. in EP 0 739 937 and WO 02/102891. The term molecular weight used herein generally denotes the weight average molecular weight $M_w$.

As mentioned, usually a polyolefin composition comprising at least two polyolefin fractions, which have been produced under different polymerisation conditions resulting in different weight average molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyolefin will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In a preferred embodiment wherein the base resin consists of two polyethylene fractions, the fraction having a lower weight average molecular weight is denoted fraction (A), the other is denoted fraction (B).

Fraction (A) preferably is an ethylene homopolymer.

Fraction (B) preferably is an ethylene copolymer, and preferably comprises at least 0.1 mol % of at least one alpha-olefin comonomer. The amount of comonomer is preferably at most 14 mol %.

In the preferred embodiment wherein the polyolefin composition is a polyethylene composition, the base resin of the polyethylene composition preferably comprises at least 0.1 mol %, more preferably at least 0.3 mol %, and still more preferably at least 0.7 mol % of at least one alpha-olefin comonomer. The amount of comonomer is preferably at most 7.0 mol %, more preferably at most 6.0 mol %, and still more preferably at most 5.0 mol %.

As an alpha-olefin comonomer, preferably an alpha-olefin having from 4 to 8 carbon atoms is used. Still more preferably an alpha-olefin selected from 1-butene, 1-hexene, 4-methyl-1-pentene and 1-octene is used.

The polyolefin base resin preferably has an $MFR_5$ (190° C., 5 kg) of from 0.01 to 5.0 g/10 min, more preferably from 0.1 to 2.0 g/10 min, and most preferably from 0.2 to 0.5 g/10 min.

The density of the base resin preferably is from 930 to 960 kg/m³, more preferably is from 935 to 958 kg/m³, and most preferably is from 938 to 952 kg/m³.

In addition to the base resin and the stabilizers, usual additives for utilization with polyolefins, such as pigments (for example carbon black), further stabilizers, antiacids and/or anti-UVs, antistatic agents and utilization agents (such as processing aid agents) may be present in the polyolefin composition.

The amount of such additives usually is 10 wt % or below.

The polymerisation catalysts for the production of the base resin include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention, reference is made to WO 2004/055068 and WO 2004/055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The composition preferably is produced in a process comprising a compounding step, wherein the base resin—which is typically obtained as a base resin powder from the reactor—together with the stabilizers and optionally other additives is extruded in an extruder to yield the polyolefin composition used in the present invention.

Of course, when using the polyolefin composition, further compounds selected from conventional additives, fillers, minerals and lubricants may be added for improving processability and surface characteristics thereof.

A pipe according to the present invention—black as well as natural (i.e. non-colored) or colored pipe is made of the polyolefin composition, preferably by extrusion. Preferably, the pipe is used in a drinking water supply system. It is furthermore preferred that the pipe is a cold water pipe, i.e. that it is designed for the transport of cold water.

The present invention is also directed to the use of a polyolefin composition as defined above, including all of the preferred embodiments, for the production of a pipe, preferably by extrusion.

EXAMPLES

1. Definitions and Measurement Methods a) Density

Density is measured according to ISO 1183. Sample preparation is done in accordance with ISO 1872/2B.

b) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and may be determined at different loadings such as 2.16 kg ($MFR_2$), 5.00 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.

c) Pressure Testing

The pressure resistance (in hours) of the pipe was determined according to ISO 1167. The pipes (32 mm outer diameter, 3 mm wall thickness) were tested at different temperature and pressure as indicated in the individual example (table 1).

d) Measurement of Phenolic Decomposition and/or By-Products Migration-into-Water Pipe samples (32×3 mm) were leached with unchlorinated water according to EN-12873-1 at room temperature (23±2° C.). Water from the third migration period was analyzed for content of organic compounds. Water samples were extracted with methylene chloride. Isotopically labelled internal standards were added to the water before said extraction. After concentration of the extracts, isotopically labelled injection standard was added, and the extracts were analyzed by gas chromatography with mass selective detector according to the draft CEN standard "The GC-MS identification of water leachable organic substances from materials in contact with water intended for human consumption". This draft CEN Standard has been prepared by CEN TC 164 WG3 AHG7 based on the co-normative research project EVK1-CT 2000-00052 and work funded by DG Enterprise and Industry (Grant Agreement S12.403892).

As procedural blank, ultra pure water (Milli-Q) stored in acid washed glassware under the same time periods as leaching tests, was extracted with methylene chloride and all standards were added as described in the test method.

The ratio of the surface area (S) of the test piece intended to come into contact with test water to volume (V) of the test water shall be expressed per decimeter, i.e. $dm^{-1}$ (which is $dm^2/dm^3$ or $dm^2$/liter). Surface-to-volume (S/V) ratio should be in the range of 5 $dm^{-1}$ to 40 $dm^{-1}$. In the present invention the ratio S/V was 15.4 $dm^{-1}$.

The concentrations were then calculated according to $$[D]=AD/AI\times[I]$$

where

[D] is the concentration of a compound D (in µg/liter);

AD is the peak area of compound D;

AI is the peak area of the internal standard;

[I] is the concentration of the internal standard (in µg/liter)

Phenolic compounds were quantified using the same compounds as calibrant, where possible. Other phenolic compounds found in the samples were quantified using structurally similar compounds.

2. Samples Prepared and Results Obtained

The compositions of the examples were compounded/melt homogenized in a Buss-Co-Kneader 100 MDK/E-11 L/D. Polymer and additives were fed into the first mixer inlet of the Buss Co-Kneader which is a single screw extruder with a downstream discharge single extruder with pelletizing unit cutting pellets in molten stage and cooled via water. The mixer temperature profile was 113/173/199/193/200° C. from first inlet to outlet, and discharge extruder temperature 166° C. The mixer screw rpm was 201 rpm and the throughput 200 kg/h. Pipes 32×3 mm (outer diameter×wall thickness) were prepared by extrusion in a Battenfeld 45-25B extruder, which gave an output of 33 kg/h at a screw speed of 54 rpm. The extruder melt temperature was 215° C. Pipes 12×2 mm (outer diameter×wall thickness) were prepared by extrusion in a Battenfeld 45-25B extruder, which gave an output of 15 kg/h at a screw speed of 20 rpm. The extruder melt temperature was 214° C. 12×2 mm pipes were used in the lifetime tests, 32×3 mm pipes in the migration tests.

The following compounds were used in the preparation of the compositions/pipes:
Tris(2,4-di-t-butylphenyl)phosphate (Irgafos 168, CAS-no. 31570-04-4) commercially available from Ciba Specialty Chemicals.
Pentaerythrityl-tetrakis(3-(3',5'-di-tert. butyl-4-hydroxyphenyl)-propionate (Irganox 1010, CAS-no. 6683-19-8) commercially available from Ciba Specialty Chemicals.
Octadecyl 3-(3',5'-di-tert. butyl-4'-hydroxyphenyl)propionate (Irganox 1076, CAS-no. 2082-79-3) commercially available from Ciba Specialty Chemicals.
Irgastab FS 042 (CAS-no. 143925-92-2) commercially available from Ciba Specialty Chemicals).
Chimassorb 2020 (CAS-no. 192268-64-7) commercially available from Ciba Specialty Chemicals.
Carbon Black Masterbatch:

The carbon black masterbatch (Carbon black MB) contained 60.4 wt % high density polyethylene, 39.5 wt % carbon black and 0.1 wt % Irganox 1010.
Base Resin:

Polyolefin (A) used as base resin in all samples is an unstabilised bimodal high density polyethylene with a total 1-butene comonomer content of 1.0 wt % whereby the comonomer is present exclusively in the high molecular weight part of the polyethylene, an $MFR_5$ of 0.25 g/10 min, and a density of 949 kg/m$^3$.

Table 1 shows the compositions prepared. If not indicated otherwise, the values are given in wt %. Still further, in Table 1 the results of the migration testing are also shown, the latter are given as total amount of phenolic compounds in water. Finally, the result of pressure testing under different conditions is shown.

TABLE 1

|  | Comp. Example 1 | Example 1 | Example 2 |
|---|---|---|---|
| base resin | 93.88 | 93.89 | 93.69 |
| Calcium stearate | 0.15 | 0.15 | 0.15 |
| Carbon black MB | 5.75 | 5.75 | 5.75 |
| Irgafos 168/ppm | 1100 | — | — |
| Irganox 1076/ppm | 1100 | — | — |
| Irgastab FS 042/ppm | — | 1100 | 1100 |
| Chimassorb 2020/ppm | — | 1000 | 3000 |
| stabilizers, total/ppm | 2200 | 2100 | 4100 |
| total amount of phenolic comp./ppb | 0.8 | 0.0 | 0.0 |
| time to failure (20° C., 12.4 MPa)/h | 571 | 1191 | 1382 |
| time to failure (20° C., 12.4 MPa)/h | 2618 | 2132 | 1538 |
| time to failure (20° C., 12.4 MPa)/h | 1395 | 4088 | 820 |
| time to failure (20° C., 12.4 MPa)/h $^a$ | 1528 | 2470 | 1247 |
| time to failure (80° C., 5.0 MPa)/h | >15000 | >15000 | >15000 |
| time to failure (80° C., 5.0 MPa)/h | >15000 | 14147 | >15000 |
| time to failure (80° C., 5.0 MPa)/h | >15000 | 6598 | >15000 |

$^a$ average of three samples

The requirements of standard EN 12201-2 for PE100 pipes are fulfilled (20° C., 12.4 MPa: >100 h; 80° C., 5.0 MPa: >1000 h).

The invention claimed is:
1. A pipe comprising a polyolefin composition comprising
a) a polyolefin base resin (A) which comprises two or more polyethylene fractions with different weight average molecular weight,
b) a stabilizer (B) according to formula (I)

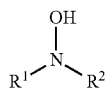

or formula (II)

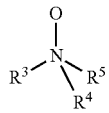

wherein $R^1$, $R^2$, $R^3$, $R^4$ and $R^5$ are independently from each other non-substituted or substituted aliphatic or aromatic hydrocarbyl radicals with not more than 50 carbon atoms each, which may comprise heteroatoms; and
c) a stabilizer (C) according to formula (III)

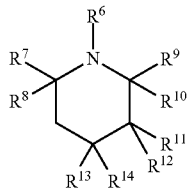

or formula (IV)

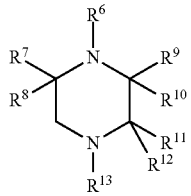

wherein
$R^6$ is hydrogen or a non-substituted or substituted aliphatic or aromatic hydrocarbyl radical, which may comprise heteroatoms,
$R^7$, $R^8$, $R^9$ and $R^{10}$ are independently from each other non-substituted or substituted aliphatic or aromatic hydrocarbyl radicals, which may comprise heteroatoms,
$R^{11}$ and $R^{12}$ are independently from each other hydrogen or non-substituted or substituted aliphatic or aromatic hydrocarbyl radicals, which may comprise heteroatoms, or are together a substituent =O, and
$R^{13}$ and/or $R^{14}$ are independently from each other hydrogen or non-substituted or substituted aliphatic or aromatic hydrocarbyl radicals, which may comprise heteroatoms.

2. The pipe according to claim 1, wherein stabilizer (B) is according to formula (I) and stabilizer (C) is according to formula (III).

3. The pipe according to claim 1, wherein $R^1$, $R^2$, $R^3$ and $R^4$ are non-substituted or substituted aliphatic or aromatic hydrocarbyl radicals, which do not comprise heteroatoms and comprise between twelve and 25 carbon atoms each.

4. The pipe according to claim 3, wherein $R^1$, $R^2$, $R^3$ and $R^4$ are alkyl chains.

5. The pipe according to claim 1, wherein $R^5$ is an aliphatic hydrocarbyl radical not comprising heteroatoms and comprises not more than five carbon atoms.

6. The pipe according to claim 5, wherein $R^5$ is an alkyl chain.

7. The pipe according to claim 1, wherein $R^6$ is a hydrogen atom or comprises an alkyl chain with 1 to 5 carbon atoms and does not comprise heteroatoms.

8. The pipe according to claim 1, wherein $R^7$, $R^8$, $R^9$ and $R^{10}$ are alkyl chains comprising 1 to 10 carbon atoms and do not comprise any heteroatom.

9. The pipe according to claim 1, wherein both $R^{11}$ and $R^{12}$ are hydrogen atoms.

10. The pipe according to claim 1, wherein $R^{13}$ comprises a backbone of a polymeric structure, wherein the atom of the polymeric structure which is directly attached to the carbon atom of formula (III) or (IV) is a nitrogen atom.

11. The pipe according to claim 1, wherein $R^{14}$ is a hydrogen atom.

12. The pipe according to claim 1, wherein from the polyolefin composition an amount of at most 5 microgram of phenolic decomposition and/or by-products per liter of water (microg/liter) migrates into water, measured according to the migration-into-water analysis method.

13. The pipe according to claim 1, wherein the polyolefin base resin (A) consists of two polyethylene fractions (A) and (B), wherein fraction (A) has a lower molecular weight and is an ethylene homopolymer and fraction (B) has a higher molecular weight and is an ethylene copolymer.

14. The pipe according to claim 1, wherein the polyolefin base resin (A) has an $MFR_5$ (190° C., 5 kg) from 0.01 to 5.0 g/10 min.

15. The pipe according to claim 1, wherein the polyolefin base resin (A) has a density from 930 to 960 kg/m³.

* * * * *